United States Patent [19]
Arman et al.

[11] Patent Number: 5,521,841
[45] Date of Patent: May 28, 1996

[54] BROWSING CONTENTS OF A GIVEN VIDEO SEQUENCE

[75] Inventors: Farshid Arman, Hamilton Square; Remi Depommier, Lawrenceville; Arding Hsu, Kendall Park; Ming-Yee Chiu, Princeton Junction, all of N.J.

[73] Assignee: Siemens Corporate Research, Inc., Princeton, N.J.

[21] Appl. No.: 221,221

[22] Filed: Mar. 31, 1994

[51] Int. Cl.$^6$ ............................. B11B 27/02; G06F 17/00
[52] U.S. Cl. ..................... 364/514 A; 395/154; 395/100; 345/112
[58] Field of Search ........................... 364/514 A, 514 B, 364/514 C, 514 R; 395/154, 100, 106, 109; 358/311; 345/112, 121, 115

[56] References Cited

U.S. PATENT DOCUMENTS

| | | | |
|---|---|---|---|
| 4,685,003 | 8/1987 | Westland | 360/14.1 |
| 4,755,956 | 7/1988 | Porawski | 364/518 |
| 4,876,597 | 10/1989 | Roy et al. | 358/141 |
| 4,943,866 | 7/1990 | Barker et al. | 358/335 |
| 4,949,193 | 8/1990 | Kiesel | 360/14.1 |
| 4,970,663 | 11/1990 | Bedell et al. | 364/521 |
| 4,979,050 | 12/1990 | Westland et al. | 360/14.1 |
| 5,065,345 | 11/1991 | Knowles et al. | 395/154 |
| 5,083,860 | 1/1992 | Miyatake et al. | 352/129 |
| 5,101,364 | 3/1992 | Davenport et al. | 395/152 |
| 5,109,482 | 4/1992 | Bohrman | 395/154 |
| 5,136,395 | 8/1992 | Ishii et al. | 358/335 |
| 5,177,513 | 1/1993 | Saito | 352/129 |
| 5,179,449 | 1/1993 | Doi | 358/311 |
| 5,267,351 | 11/1993 | Reber et al. | 395/600 |
| 5,283,864 | 2/1994 | Knowlton | 395/158 |
| 5,307,456 | 4/1994 | Mackay | 395/154 |
| 5,317,732 | 5/1994 | Gerlach, Jr. et al. | 359/600 |
| 5,355,450 | 10/1994 | Garmon et al. | 395/162 |
| 5,388,197 | 2/1995 | Rayner | 395/154 |
| 5,404,316 | 4/1995 | Klingler et al. | 364/514 |

OTHER PUBLICATIONS

Mills, "Media Composition for Casual Users", 1992.
Arman et al., "Feature Management for Large Video Databases", 1993. (Abstract Only).
Mackay et al., "Virtual Video Editing in Interactive Multimedia Applications", 1989.
Iyengar et al., "Codes Designs for Image Browsing", 1994.
Iino et al., "An Object–Oriented Model for Spatio–Temporal Synchronization of Multimedia Information", May, 1994.
Rangan et al., "A Window–based Editor for Digital Video and Audio", Jan. 1992.
"Watch–Grab–Arrange–See: Thinking with Motion Images via Streams and Collages", Elliott, Ph.D. Thesis, MIT, Feb. 1993.
"Image Information Systems: Where Do We Go From Here?", Chang et al., IEEE Transactions on Knowledge and Data Engineering, vol. 4, No. 5, Oct. 1992, pp. 431–442.
"Pattern Recognition Experiments in the Mandala/Cosine Domain", Hsu et al., IEEE Transactions on Pattern Analysis and Machine Intelligence, vol. PAMI–5, No. 5, Sep. 1983, pp. 512–520.

(List continued on next page.)

*Primary Examiner*—Ellis B. Ramirez
*Assistant Examiner*—Patrick J. Assouad
*Attorney, Agent, or Firm*—Adel A. Ahmed

[57] ABSTRACT

A method for representing contents of a video sequence for allowing a user to rapidly view a video sequence in order to find a particular desired point within the sequence and/or to decide whether the contents of a video sequence are relevant to a user, the video sequence having been pre-processed to detect scene changes and to build Rframes, and for allowing a user to scroll through the Rframes and to stop at a selected Rframe for processing, comprises playing the video sequence from a point of the selected Rframe, detecting all Rframes having respective degrees of similarity to the Rframe selected by the user, and presenting the similar Rframes to the user in a size or scale representative of the degrees of similarity.

9 Claims, 7 Drawing Sheets

OTHER PUBLICATIONS

"A New Family of Algorithms for Manipulating Compressed Images", Smith et al., IEEE Computer Graphics and Applications, 1993.

"MPEG: A Video Compression Standard for Multimedia Applications, Le Gall, Communications of the ACM", vol. 34, No. 4, Apr. 1991, pp. 47–58.

"The JPEG Still Picture Compression Standard", Wallace Communications of the ACM, vol. 34, No. 4, Apr. 1991, pp. 31–44.

"Overview of the px64 kbit/s Video Coding Standard", Liou, Communications of the ACM, vol. 34, No. 4, Apr. 1991, pp. 60–63.

"News On–Demand for Multimedia Networks", Miller et al., ACM International Conference on Multimedia, Anaheim, CA, 1–6 Aug. 1993, pp. 383–392.

"Image Processing on Compressed Data for Large Video Databases", Arman et al., Proceedings of First ACM International Conference on Multimedia, Anaheim, CA, 1–6 Aug. 1993, pp. 267–272.

"Image Processing on Encoded Video Sequences", Arman et al., ACM Multimedia Systems Journal, to appear 1994.

"A Magnifier Tool for Video Data", Mills et al., Proceedings of ACM Computer Human Interface (CHI), May 3–7, 1992, pp. 93–98.

"The Revised Fundamental Theorem of Moment Invariants", Reiss, IEEE Transactions on Pattern Analysis and Machine Intelligence, vol. 13, No. 8, Aug. 1991, pp. 830–834.

"Color Indexing", Swain et al., International Journal of Computer Vision, vol. 7, No. 1, 1991, pp. 11–32.

"Anatomy of Color Histogram", Novak et al., Proceeding of Computer Vision and Pattern Recognition, Champaign, IL, Jun. 1992, pp. 599–605.

"Content Oriented Visual Interface Using Video Icons for Visual Database Systems", Tonomura et al., Journal of Visual Languages and Computing (1990) 1, pp. 183–198.

"VideoMAP and VideoSpaceIcon: Tools for Anatomizing Video Content", Tonomura et al., InterCHI'93 Conference Proceedings, Amsterdam, The Netherlands, 24–29 Apr., 1993, pp. 131–136.

"Automatic Structure Visualization for Video Editing", Ueda et al., InterCHI'93 Conference Proceedings, Amsterdam, The Netherlands, 24–29 Apr. 1993, pp. 137–141.

"Developing Power Tools for Video Indexing and Retrieval", Zhang et al., Proceedings of SPIE Conference on Storage and Retrieval for Image and Video Databases, San Jose, CA, 1994.

"Impact: An Interactive Natural–Motion–Picture Dedicated Multimedia Authoring System", Ueda et al., Proceedings of Human Factors in Computing Systems (CHI 91), New Orleans, LA, Apr. 27–May 2, 1991, pp. 343–350.

"Pattern Recognition by Moment Invariants", Hu et al., Proc. IRE, vol. 49, 1961, p. 1428.

"Visual Pattern Recognition by MomentInvariants", IRE Trans. Inform. Theory, vol. 8, Feb. 1962, pp. 179–187.

"Automatic Video Indexing and Full–Video Search for Object Appearances", Nagasaka et al., Proceedings of the IFIP TC2/WG2.6 Second Working Conference on Visual Database Systems, North Holland, Sep. 30–Oct 3, 1991. pp. 113–127.

BROWSING CONTENTS OF A GIVEN VIDEO SEQUENCE

The present invention relates to the task of browsing through video sequences. More particularly, the invention also relates to systems incorporating encoded video, wherein the ability to manage video data and display information efficiently is of particular importance and to low level management techniques for digital video.

For systems incorporating encoded video, such as video editing systems, various multimedia authoring systems, video-based training systems, and video on demand systems, the ability to manage video data and display information efficiently is critical. While known systems may incorporate other types of media as well, management of video is particularly difficult because of the vast volume of data associated with it and the high data rates involved, typically, many megabytes of data per minute. Prior steps taken towards the solution of video management problems have either relied on labor intensive techniques, such as manually entering keywords to describe the video contents, or on simple image processing techniques, such as analyzing histograms. These approaches have drawbacks and are neither close to providing ideal solutions, nor are they efficient in their tasks. Keywords have many drawbacks, such as, typically, an inadequate choice of terms for use at search time, the variable context in which the words are used, and the influence of the individual operator. See, for example, S-K. Chang and A. Hsu, Image information systems: Where do we go from here? IEEE Transactions on Knowledge and Data Engineering, 4(5):431–442, October 1992.

Furthermore, image processing steps cannot be efficiently applied to the hundreds of thousands of images that are usually associated with video. This paper presents techniques aimed at the management of encoded video, such as MPEG (D. Le Gall. MPEG: A video compression standard for multimedia applications, Communications of ACM, 34(4):46–58, April 1991.), JPEG (G. K. Wallace. The JPEG still picture compression standard, Communications of ACM, 34(4):30–44, April 1991.), and H.261 (M. Liou. Overview of the 64 kbits/s video coding standard, Communications of ACM, 34(4):59–63, April 1991.) which overcome the limitations of traditional image processing steps while enhancing keyword based approaches currently in wide use.

Sub-tasks of video management include the ability to quickly locate a particular video sequence—herein referred to as high level video management—and the ability to view particular points of interest within the video sequence—herein referred to as low level video management. The need for management of video exists in many domains, from TV news organizations where these capabilities are critical, to home video libraries where such capabilities can be very useful.

The present invention is concerned more particularly with low level management techniques for digital video. Currently, a widely used search technique, applicable, for example, to a tape recording machine, is to fast-forward and rewind to arrive at the point of interest. This technique is slow and inefficient. More recently, image processing techniques have been developed to operate on digital video in order to facilitate this task. A first step in solving this problem is to "divide" the video sequence into meaningful segments much like text in a book can be divided up into sentences. In video, a logical point to partition the video sequence is where the contents of video "change" in some way from one frame to the next—referred to as a scene change.

The past research work involving low level video management has concentrated on the parsing of video sequences into video clips. In most cases, the logical parsing point is a change in the camera view point or a change in the scene. Usually, the histogram of each scene is generated and a large change in the histogram from one scene to the next is used as a cutting point [11]. Ueda et.al suggest the use of the rate of change of the histogram instead of the absolute change to increase the reliability of the cut separation mechanism. H. Ueda, T. Miyatake, S. Sumino and A. Nagasaka, Automatic Structure Visualization for Video Editing, in InterCHI'93 Conference Proceedings, Amsterdam, The Netherlands, 24–29 Apr. 1993, pp. 137–141. Ueda et. al also consider the zooming and the panning of the camera; each video frame is divided into a number of non-overlapping small regions and in each region the optical flow of pixels belonging to that region is approximated and classified into zooming and panning of camera. This information is then stored along with each cut. Nagasaka and Tanaka studied various measures to detect the scene changes. A. Nagasaka and Y. Tanaka, Automatic video indexing and full-video search for object appearances. In E. Knuth and L. M. Wegner, editors, Proceedings of the IFIP TC2/WG2.6 Second Working Conference on Visual Database Systems, pages 113–127. North-Holland, Sep. 30–Oct. 3, 1991. The best measure according to their studies is a normalized c2 test to compare the distance between two histograms. Additionally, to minimize the effects of camera flashes and certain other noises, the frames are each divided into several subframes. Then, rather than comparing pairs of frames, every pair of subframes between the two frames are compared, the largest differences are discarded, and the decision is based upon the differences of the remaining subframes.

The use of DCT coefficients prior to decompression has been attempted previously in other applications. Hsu et. al use DCT compressed images in a military target classification system to discriminate between man-made and natural objects. Y. Hsu, S. Prum, J. H. Kagel, and H. C. Andrews, Pattern recognition experiments in mandala/cosine domain, IEEE Transactions on Pattern Analysis and Machine Intelligence, 5(5):512–520, September 1983. The Bhattacharyya distance discriminator is used to measure and rank numerous statistical calculations derived from the DCT coefficients; and it is in turn used in the decision making process. Smith and Rowe extended many properties of the cosine/Fourier transform to used the DCT coefficients to perform several algebraic operations on a pair of images. B. C. Smith and L. A. Rowe, Algorithms for manipulating compressed images. To appear in IEEE Computer Graphics and Applications, 13(5), September 1993. Scalar addition, scalar multiplication, pixel-wise addition, and pixel-wise multiplication operations on two images were defined using the DCT coefficients; these operations are used in video editing systems to perform such tasks as dissolving and subtitling.

Tonomura et. al introduced several approaches to view the contents of videoshots: variable speed, sampling flash, rush, and time-space browser. Y. Tonomura, A. Akutsu, K. Otsuji and T. Sadakata, VideoMAP and VideoSpaceIcon: Tools for Anatomizing Video Content, in InterCHI'93 Conference Proceedings, Amsterdam, The Netherlands, 24–29 Apr. 1993, pp. 131–136. Tonomura, Y. and Abe, S., Content Oriented Visual Interface Using Video Icons for Visual Database Systems, in Journal of Visual Languages and Computing, Vol. 1, 1990, pp. 183–198. The variable speed browser, is very similar to VCR's jog and shuttle functions; the sampling flash browser is a series of icons formed from the first frame of each video shot without any clues to the contents; in the rushbrowser, instead of using video shots the sequence is divided along equally spaced time intervals; and the time-space browser displays a temporal sequence on several icons. In Y. Tonomura, A. Akutsu, K. Otsuji and T. Sadakata, VideoMAP and VideoSpaceIcon: Tools for Anatomizing Video Content, in InterCHI'93 Conference Proceedings, Amsterdam, The Netherlands, 24–29 Apr. 1993, pp. 131–136, much emphasis is placed on characterizing the contents of video shots with respect to camera and object motions.

Similar to Tonomura, Elliot introduced a browser which stacks every frame of the sequence. This approach suffers from several shortcomings: First, the stack is built as the user is watching the sequence. E. Elliott, Watch, Grab, Arrange, See: Thinking With Motion Images via Streams and Collages, Ph.D. Thesis, MIT, February 1993. This is not useful for video browsing because the user is "forced" to watch the video sequence because the stack can make sense only once the video has been seen. The second shortcoming is that the stack holds only about 20 seconds of video; this amount of video is not practical for use in actual cases. Third, once the stack is built, the user may "stroke" the stack to watch the contents. This is a minor improvement, from the user's point of view, over FF/REW. This approach fails to provide the user with a basic browsing unit, and it is more appropriate for video editing than for browsing.

Zhang et. al used the video shot as their basic browsing unit. H-J. Zhang and W. Smoliar, Developing Power Tools for Video Indexing and Retrieval, in Proceedings of SPIE Conference on Storage and Retrieval for Image and Video Databases, San Jose, Calif., 1994. Similar to Tonomura, the frames of the shot are stacked to relay motion information and duration of the shot, and a frame from a shot may be "picked up" by placing the mouse along the side of the icon. In another mode, rather than stacking the frames, the icon thickness is used to convey shot duration; this is a wasteful use of screen space since the importance of the information does not justify the amount of screen space that is used.

Mills et. al introduced a browser for quick time video sequences. M. Mills, J. Cohen and Y-Y. Wong, A Magnifier Tool for Video Data, in Proceedings of ACM Computer Human Interface (CHI), May 3–7, 1992. Similar to Tonomura's rush browser, this browser does not take into consideration the contents of the video and rather systematically divides the sequence into several equal segments. Once the user has chosen a segment it in turn is divided into equal lengths and so on until the user can view each frame. In each case, the segment is represented using its first frame. This approach is a minor improvement to FF/REW and fails to provide the user with a sense of the contents of the video. The user could easily miss the information he or she is interested in because the representation of each segment has no relation to the reminder of the frames in that segment.

Disadvantages found in the foregoing above work are that either no basic browsing unit is used and/or that each frame of the video is needed by the user during the browsing operations, making it unsuitable for use over the network. Additionally, none of the above systems address the problem of icon management. This is very important since as many as several thousand icons could be needed to represent the shots for each two hour video sequence. Ueda et. al do address this issue by using color information. H. Ueda, T. Miyatake, S. Sumino and A. Nagasaka, Automatic Structure Visualization for Video Editing, in InterCHI'93 Conference Proceedings, Amsterdam, The Netherlands, 24–29 Apr. 1993, pp. 137–141. Color, however, cannot be the sole means of representation because color histograms are a many to one mapping functions. In our video browser, shape, as well as color information is used to help the user manage icons and navigate throughout a given video sequence.

In accordance with an aspect of the invention, a computer implemented method for representing contents of a video sequence for allowing a user to rapidly view a video sequence in order to find a particular desired point within the sequence and/or to decide whether the contents of a video sequence are relevant to a user, the video sequence having been pre-processed to detect scene changes and to build Rframes, and for allowing a user to scroll through the Rframes in a given manner and to stop at a selected Rframe for processing, comprises (a) playing the video sequence from the beginning of a shot represented by the selected Rframe to the end of the shot; (b) detecting all Rframes having respective degrees of similarity to the Rframe selected by the user; and (c) presenting the similar Rframes to the user in a size or scale representative of the degrees of similarity.

In accordance with another aspect of the invention, step (b) is performed by evaluating shape properties represented by using a respective moment for each Rframe image.

In accordance with another aspect of the invention, step (b) is performed by evaluating color properties represented by using color histograms.

In accordance with another aspect of the invention, step (b) is performed by evaluating shape properties represented by using moments and color properties represented using color histograms.

In accordance with an aspect of the invention, a computer implemented method for representing contents of a video sequence for allowing a user to rapidly view a video sequence in order to find a particular desired point within the sequence and/or to decide whether the contents of a video sequence are relevant to a user, the video sequence having been pre-processed to detect scene changes and to build Rframes, and for allowing a user to scroll in a given order through the Rframes and to stop at a selected Rframe for processing, the method comprises (a) playing the video sequence from the beginning of a shot represented by the selected Rframe to the end of the shot; (b) detecting all Rframes having respective degrees of similarity to the Rframe selected by the user; (c) storing said Rframes in a storage device for retrieval, as in a computer and (d) presenting Rframes having one of a predetermined degree of similarity to the Rframe selected by the user and predetermined degree of dissimilarity to the Rframe selected by the user.

In accordance with another aspect of the invention, if Wmoment=1 then the output of the comparing using the color-histogram-based description is ignored; if Wmoment=3 then a final output is very similar, an only exception being when color-based output Whistogram=1 in which case the final output will also be 2, or somewhat similar; and utilizing mapping from using the color-histogram-based description when Wmoment is not conclusive.

In accordance with an aspect of the invention, a computer implemented method for representing contents of a video sequence for allowing a user to rapidly view a video sequence in order to find a particular desired point within the sequence and/or to decide whether the contents of a video sequence are relevant to a user, the video sequence having been pre-processed to detect scene changes and to build Rframes, and for allowing a user to scroll either chronologically, based on degree of similarity, or in some other desired order, through the Rframes and to stop at a selected Rframe for processing, comprises playing the video sequence from a point of the selected Rframe, detecting all Rframes having respective degrees of similarity to the Rframe selected by the user, and presenting the similar Rframes to the user in a size or scale representative of the degrees of similarity.

The invention will be explained by way of exemplary embodiments and by reference to the drawing, helpful to an understanding of the invention, in which FIG. 1 shows a representative frame, Rframe, for each video shot wherein are indicated (a) the structure of the Rframe, (b) motion tracking region; t=0 starts from the center of Rframe, (c)–(f) several examples;

Figure 1A:
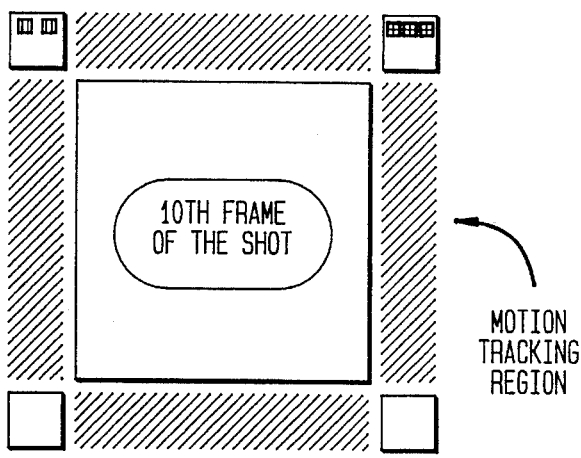
Figure 1B:
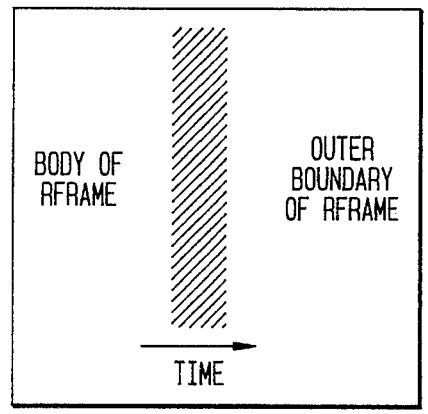
Figure 5A:
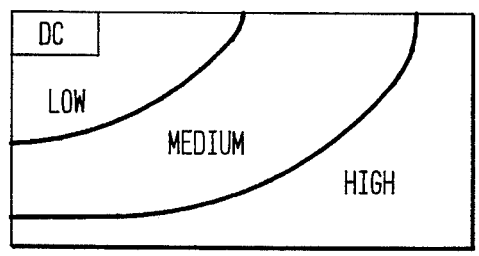
FIG. 5 shows the frequency distribution (a) and block features (b) of DCT coefficients within a block.
Figure 5B:
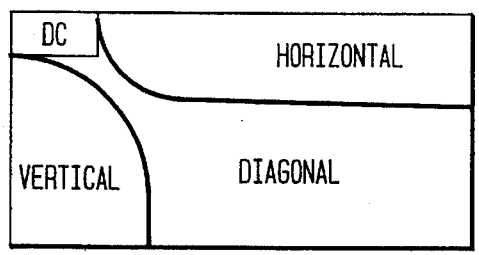
Figure 1D:
Figure 1F:
Figure 1C:
Figure 1E:
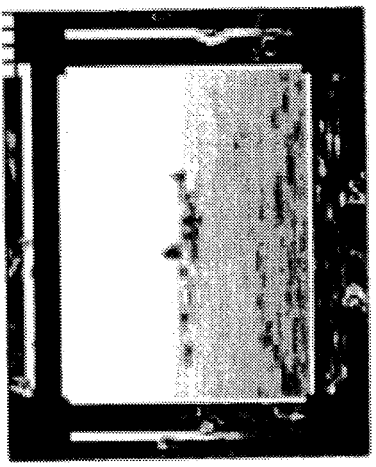
Figure 6A:
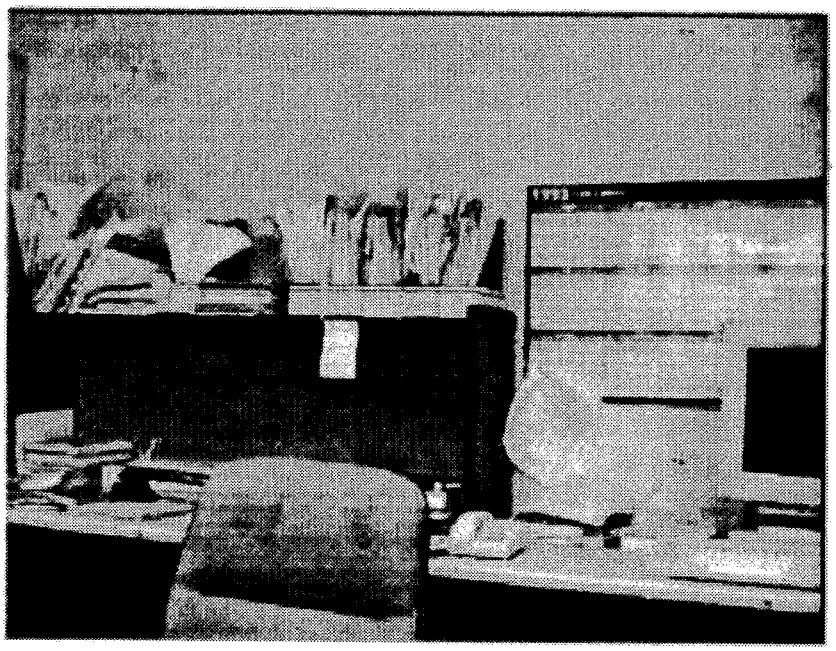
FIG. 6 shows an example of selecting subregions containing edges using the DCT coefficients. (a) The original frame. (b) The sub-regions found to contain no edges are shown in solid; the remaining regions may be decompressed for edge detection.
Figure 6B:
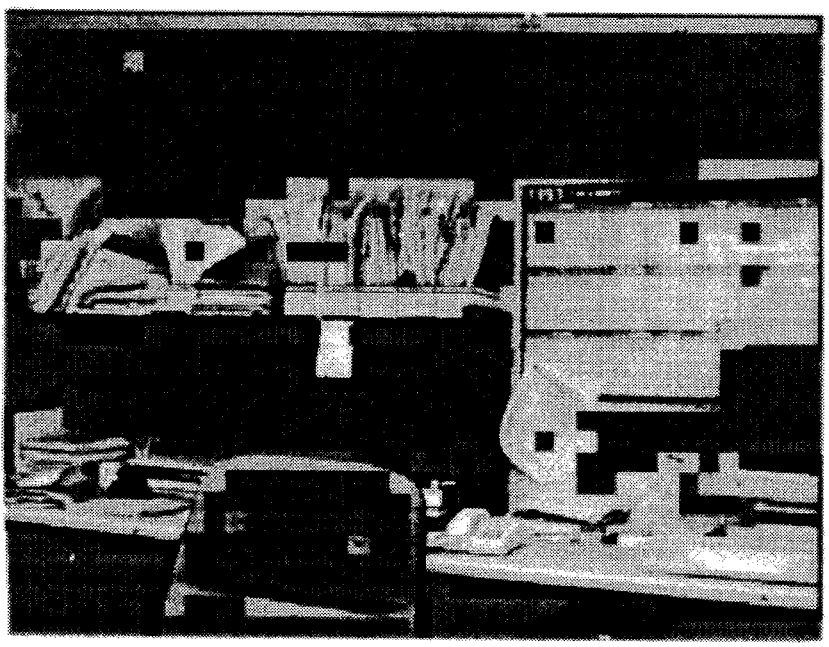

Of significance to the present invention is a technique disclosed in a U.S. patent application entitled DETECTING SCENE CHANGES ON ENCODED VIDEO SEQUENCES, being filed concurrently herewith in names of Farshid Arman, Arding Hsu, and Ming-Yee Chiu and to a U.S. patent application entitled REPRESENTING CONTENTS OF SINGLE VIDEO SHOT USING RFRAMES and being filed concurrently herewith in the names of Farshid Arman, Adring Hsu, and Ming-Yee Chiu, both applications being under obligation of assignment to the same assignee as is the present application, and whereof the disclosures are herein incorporated by reference. Scene changes are readily detected using DCT coefficients in JPEG and MPEG encoded video sequences. See FIGS. 5 and 6. Within each 8×8 DCT block, the distribution of the DCT coefficients is used to classify the block as either type 0 (contains no high frequency components) or type 1 (contains high frequency components) The changes in the distributions of 0's and 1's from one frame to next is captured using eigenvectors and used to represent scene changes. The frames in between two consecutive scene changes form a video shot. Video shots may be thought of as the building blocks of video sequences, and are used in browsing, as herein disclosed in greater detail, database indexing, or any other operations that essentially form an abstraction of the video. To visualize each video shot, the content must be abstracted in a meaningful manner such that it is representative of the contents of the shot; this is achieved using representative frames or Rframes, as herein disclosed in greater detail.

Of particular significance is the problem of detecting scene changes on encoded video sequences, particularly in the context of rapidly viewing the contents of a given video sequence, a process herein referred to as browsing. Browsing through video sequences is a critical requirement in many domains and applications in which the user is either required to choose a few video sequences from among many, and/or the user has to find a particular point within a single video sequence.

Such cases arise in numerous situations, such as in remote access of video, video database navigation, video editing, video-based education and training, and, in the near future, video e-mail and recorded desk-top video conferencing sessions. In such cases, the user must view the contents of the video sequences in order to choose the most relevant or to locate a desired point. Assigned labels, keyword descriptions, and database indexing may be useful in reducing the number of possibilities somewhat; however, in many cases the user is still left to decide among at least a number of possibilities. Consider, for instance, the case in which the user has submitted a query to a remote database and the database search has resulted in the offer of several possibilities. At this point the user must decide if the context and contents of the returned videos match the requirements. This may only be achieved by viewing each of the returned videos. Viewing video would require that each video be retrieved from, typically, a hierarchical storage system, transmitted over the network in its entirety as the user plays the video or, at most, fast forwards and rewinds. This process is time consuming, inefficient, not cost effective, and wasteful of bandwidth.

Abstractions of each of the video sequences are precomputed and the abstractions are retrieved from the system, transmitted, as may be needed, and viewed by a user. The abstractions are many orders of magnitude smaller in size than the video sequences themselves, and thus, the system's response time, bandwidth needs, and, most importantly, the user's viewing time are reduced. In addition, the proposed system allows the user to rapidly pinpoint a desired location within a video sequence.

In accordance with an aspect of the invention, content-based video browsing is achieved by pre-processing steps which are performed off-line before the user gains access:

(a) detect scene changes in the compressed video to form video shots; and (b) construct the abstractions for each video shot to represent the contents.

The abstractions are referred to as Rframes. Additionally, a number of steps are performed during browsing which are driven by the users' particular needs:

(c) present the Rframes so that the user can easily search the contents of the video sequence; and (d) apply a technique to manage the Rframes comprising combining similarity measurements based on shape and color.

Processing during the browsing is necessary because each user may be different and may have varying needs at different times even for the same sequence.

In accordance with the present invention, the methodology herein disclosed represents the contents of a video sequence. The representation is used to allow the user to rapidly view a video sequence in order to find a particular point within the sequence and/or to decide whether the contents of the sequence are relevant to his or her needs. This system, referred to as content-based browsing, forms an abstraction, as herein disclosed in greater detail, to represent each detected shot, of the sequence by using a representative frame, or an Rframe, as herein disclosed, and it includes management techniques to allow the user to easily navigate the Rframes. This methodology is superior to the current techniques of fast forward and rewind because rather than using every frame to view and judge the contents, only a few abstractions are used. Therefore, the need to retrieve the video from a storage system and to transmit every frame over the network in its entirety no longer exists, saving time, expenses, and bandwidth.

Content-based browsing is advantageous over the fast forward and rewind technique (FF/REW) while nevertheless being as convenient to use. Using FF/REW the user must view every frame at rapid speeds, with the likelihood of missing shots that last a short period, while being forced to watch long lasting and possibly irrelevant shots. In addition, users searching for a specific point within a sequence are typically forced to refine their search after a number of fast forward and rewind operations until the video is at the precise point of interest, a time-consuming and tedious task. In the content-based browser in accordance with the invention, the exact points of scene changes are defined internally, and no "fine tuning" by the user is necessary. It is noteworthy that the above described disadvantages of FF/REW persist even on digital video and on other random access media, such as laser disks. Lastly, FF/REW as the means for browsing of digital video is extremely inefficient considering, the expense of accessing disks and/or tapes, decoding, and transmission.

In relation to the processing of compressed video efficiently for scene change detection, selective decoding is utilized to take advantage of the information already encoded in the compressed data; specifically a discrete cosine transform (DCT)-based standard such as JPEG (see G. K. Wallace, "The JPEG still picture compression standard", Communications of ACM, 34(4):30–44, April 1991) or H.261 (M. Liou. Overview of the 64 kbits/s video coding standard, Communications of ACM, 34(4):59–63, April 1991.) and many processing steps needed on every frame of a video sequence are performed prior to full decompression. The DCT coefficients are analyzed to systematically detect scene changes or video cuts which are used in browsing or in further feature extraction and indexing. In the past, expensive operations such as color histogram analysis, have been performed on every frame to achieve the same tasks. D. Le Gall. MPEG: A video compression standard for multimedia applications. Communications of ACM, 34(4):46–58, April 1991.

Figure 7:
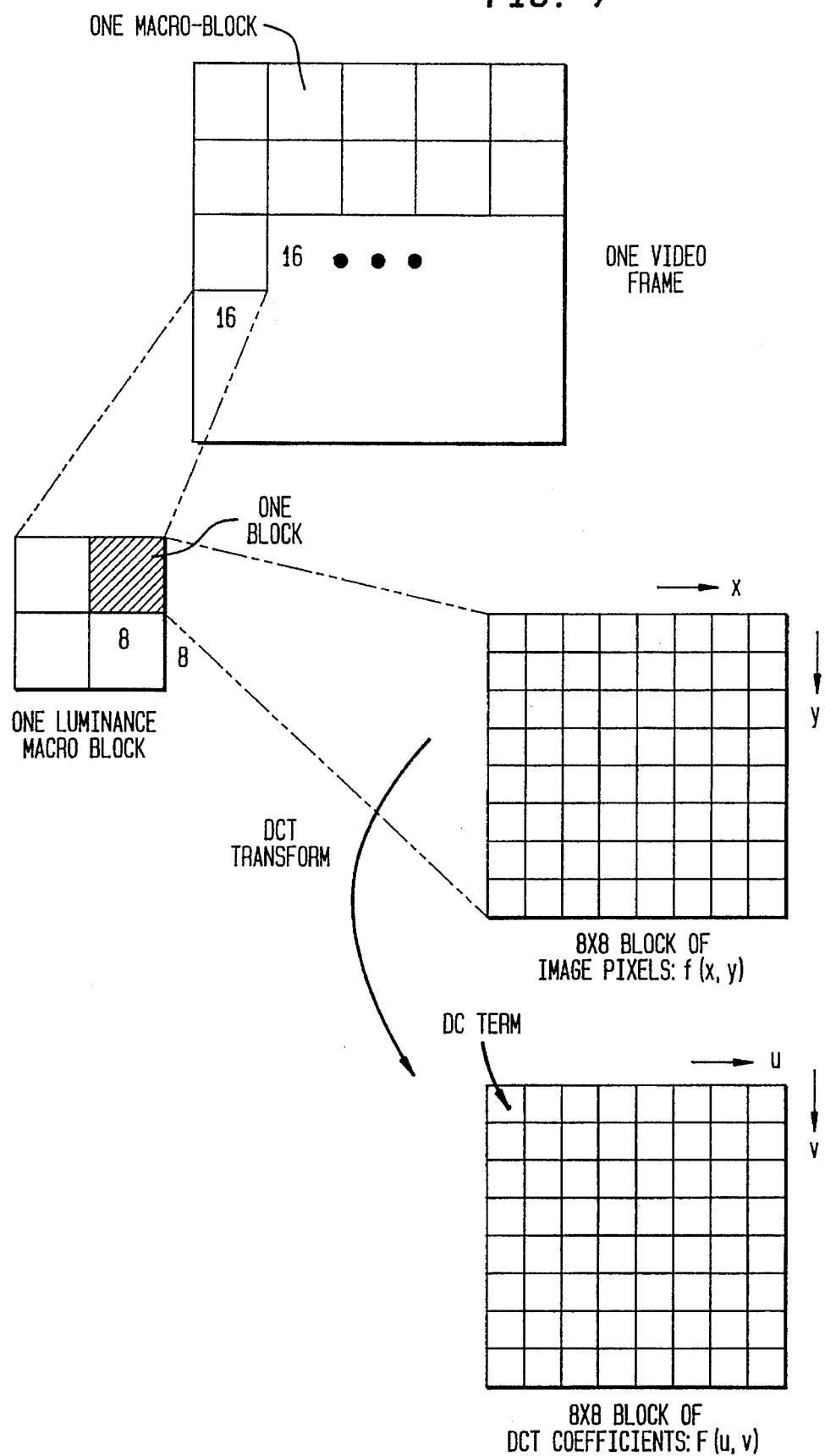
FIG. 7 shows an overview of the DCT and block concepts and the process of performing DCT transform on each frame of a video sequence.

The encoding standards process begins with dividing each color component of the image into a set of 8×8 blocks. FIG. 7 shows an overview of the DCT and block concepts. The pixels in the blocks are then each transformed using the forward discrete cosine transform (DCT):

$$F(u,v) = \frac{1}{4} C(u)C(v) \left[ \sum_{x=0}^{7} \sum_{y=0}^{7} f(x,y) \cdot \cos\frac{(2x+1)u\pi}{16} \cos\frac{(2y+1)v\pi}{16} \right]$$

where $C(\tau) = 1/(\sqrt{2})$ if $\tau = 0$ and 1 otherwise, $F(u,v)$ are the DCT coefficients, and $f(x,y)$ are the input pixels. $F(0,0)$ is the DC term—the average of the 64 pixel values, and the remaining 63 coefficients are termed the AC coefficients. The 64 coefficients from each block are then quantized to preserve only the visually significant information:

$$\tilde{F}(u,v) = \left[ \frac{F(u,v)}{Q(u,v)} \right]$$

where $Q(u,v)$ are the elements of the quantization table, and [ ] represents the integer rounding operation. The coefficients are then encoded in a zig-zag order by placing the low order frequency components before the high frequency components. The coefficients are then encoded using the Huffman entropy encoding. The processing presented next assumes that the encoded data has partially been decoded by applying the Huffman decoder and the resultant coefficients may or may not have been dequantized depending on the quantization table. See FIG. 5 for the frequency distribution (a) and block features (b) of DCT coefficients within a block. Zero coefficients in the "high" regions indicate that the 8×8 block has low frequency components only and substantially no high frequency components. See FIG. 6 for an example of selecting subregions containing edges using the DCT coefficients. (a) The original frame. (b) The sub-regions found to contain no edges are shown in solid; the remaining regions may be decompressed for edge detection.

The approach herein differs from previous solutions in that, inter alia, unlike prior methods wherein all steps are performed on decompressed video frames, the present approach takes advantage of the fact that the incoming video is already in the compressed form. Thereafter, the information that is already encoded in the compression process is utilized to take advantage of several facts: first, the computational cost of fully decompressing every frame is not necessary and is saved when only a selected number of frames are chosen prior to decompression for further processing or for browsing. Second, coefficients in the spatial frequency domain are mathematically related to the spatial domain, and they may directly be used in detecting changes in the video sequence. Third, the knowledge of the blocks' location preserves spatial domain information to a certain extent.

The scene change detection is performed by the application of a programmed computer in accordance with the following method or "algorithm":

(a) examine each DCT block in the compressed video frame, and if high frequency coefficients exist mark that block as 1, else mark that block as 0. The output of this step is a matrix of 0s and 1s. The size of this matrix is determined by the size of the video frame divided by 8 length wise and width wise. For example, a 320×240 video frame will yield a 40×30 matrix;

(b) delete columns or rows to transform the matrix of step 1 into a square matrix; for example delete 10 columns to obtain a 30×30 matrix. Preferably, for every frame of the video, the same corresponding columns or rows are deleted. This step may include subsampling to reduce the matrix size. For example, delete every other row and column. The final output from this step is an n×n matrix;

(c) derive the two principal vectors of the matrix, to describe the contents of each video frame, in accordance with principles of linear algebra that state that each n×n matrix has at least one and at most n eigenvalues: $\lambda_i$, $1 \geq i \geq n$. and for two dimensional shapes there will be 2 eigenvalues, that each eigenvalue will have a corresponding eigenvector, and that these two vectors are the principal vectors of the matrix;

(d) detect a change in the content from one video frame to the next, or scene changes, by utilizing the inner product to detect such change, since a change in the content from one video frame to the next, or scene changes, will also cause the vectors to change in accordance with the following expression:

$$\partial(f, f + \Delta) = \frac{\overrightarrow{x_i(f)} \cdot \overrightarrow{x_i(f + \Delta)}}{\left| \overrightarrow{x_i(f)} \right| \left| \overrightarrow{x_i(f + \Delta)} \right|}, \text{(where } i \in \{1,2\}) \quad (1)$$

where $\Delta$ is the temporal distance in between two frames; and (e) if, $\partial$, $1 \geq \partial \geq 0$, is larger than a threshold, $\tau$, then indicate that a scene change has occurred.

The video content in between two scene changes is labeled as a "shot".

If the format of the video is motion JPEG, then the DCT coefficients of step (a) are obtained from each frame and Equation (1) is applied as stated in step (e). In case the format is MPEG where three types of frames are defined (I, B, and P), each two frames in Equation (1) must be of the same type; i.e, Equation (1) cannot compare an I frame with the neighboring B or P frame.

Reference is made to the afore-mentioned U.S. patent application entitled REPRESENTING CONTENTS OF SINGLE VIDEO SHOT USING RFRAMES and being filed concurrently herewith in the names of Farshid Arman, Adring Hsu, and Ming-Yee Chiu and being subject to an obligation of assignment to the same assignee as is the present application. Each detected shot is represented using an Rframe, which is designed to allow the user to perform five tasks: first, to be able to judge the contents of the shot. Second, to decide if the scene change detection may have missed a shot. While many of the proposed scene change detectors have high accuracy rates of 90% and above, none claims 100% accuracy; in addition, many complicated transitions can cause false negatives during scene change detection. Therefore, from the user's point of view, it is desirable that there be a mechanism to ensure the user that no scene changes have been missed during this shot. The third task of the Rframe is to provide the user with the sense of motion within the shot. The fourth feature allows the user to easily determine the length or duration of the shot in seconds. The fifth allows the user to determine if any captions appear in the video shot. In order to form the Rframes the video sequence must have already been divided into meaningful segments, such as video shot (the frames in between two consecutive scene changes form a video shot, as herein disclosed. The collection of Rframes is used to represent the contents of the entire video sequence in browsing and in navigation operations, as herein explained in relation to browsing the contents of a given video sequence.

Each Rframe comprises a body, four motion tracking regions, shot length indicators and a caption indicator. See FIG. 1. The body of the Rframe is a frame chosen from the video shot; currently, the tenth frame is chosen, but other possibilities exist, such as the last frame for zoom-in shots. The motion tracking regions trace the motion of boundary pixels through time; hence they can be used as guides to camera, or global, motion. The motion tracking regions also serve as an indicator of missed scene changes. In case the shot contains a scene change, the tracking of boundary pixels will "fail" causing a straight line to appear in the motion tracking region (see FIG. 1-$e$). The time indicators are designed so that a brief glance at each Rframe allows the user to determine if the corresponding shot is long or short while a more precise estimation of the length of the shot is also possible well by counting the 2 and 4 second squares. This representation of shot length does not occupy any valuable screen space; printing the exact number of seconds on the other hand would not allow the user to quickly compare shot lengths.

In FIG. 1, a representative frame, Rframe, for each video shot is shown. (a) shows the structure of the Rframe, (b) shows motion tracking region; t=0 starts from the center of Rframe, (c)–(f) show several examples: (c) the anchorman has moved his hands but the camera is stationary as is evidenced by the straight lines, and the shot contains a caption; (d) shows that the camera has panned to the left following the motion of the animal, the curves start (t=0) and move to the right, no captions are present in this shot; (e) shows an example of a missed scene change, the straight lines not in contact with the center indicate the possibility that the shot may contain a scene change; (f) shows that the camera is stationary but the objects have moved in various directions; this shot contains a caption.

To construct the motion tracking regions, the shot is sub-sampled to select a few of the frames. Four slices, one from each side, of each selected frame are then stacked and an edge detection algorithm is applied to each of the four stacks. This simple operation in effect tracks the border pixels from one frame to the next enabling the user to visualize the motion.

Edge detection is a local operation performed using the principles of convolution. A mask which is an m×m matrix is convolved with the pixels ineach of the motion tracking regions. The output of the convolution highlights the pixels where there are changes in two neighboring pixels, where neighboring means left, right, top, or bottom. Many m×m matrices exist, such as the Laplacian matrix:

$$\begin{matrix} 0 & 0 & 0 \\ 1 & -4 & 1 \\ 0 & 1 & 0 \end{matrix}$$

Reference is made to Gonzalez, op. cit. for more details.

As mentioned earlier, video sequences require a "basic browsing unit" which can be used in browsing, and unlike the case of newspapers or books where an editor manually chooses the headline for each article or chapter, the process of choosing the video browsing unit must be automatic. This is because of the vast amount of data that will exist in the video sequences. Furthermore, manual intervention would inherently incorporate extrinsic influences into the material. This influence could in turn impede a user's search by providing false leads or not enough leads and thereby requiring the user to use FF/REW. While the process of choosing the video browsing unit must be automatic, its result must also be meaningful to the user because this is the tool used to decide whether the returned video sequences are relevant to the task at hand. A remaining issue in designing a videobrowser is its speed; the video browser must be significantly faster, as compared with FF/REW, while remaining convenient to use.

A video browser disclosed herein in accordance with the present invention satisfies such requirements. The present video browser uses shots as the basic building blocks of a video sequence characterized by the use of "representative frames", or Rframes. The sequences in the video collection are pre-processed once to detect the scene changes and to build the Rframes. Then, to browse (through) a particular videosequence, the user may scroll through all the Rframes to view the visual contents of the sequence. Once the user has chosen an Rframe, the corresponding video shot may be played back. Further information, such as the length of each shot and the approximate motions, are readily represented as well. In cases in which several hundred scenes, and therefore several hundred Rframes, may exist in a given video sequence, advanced techniques are used to allow the user to easily manage the information.

Figure 2:
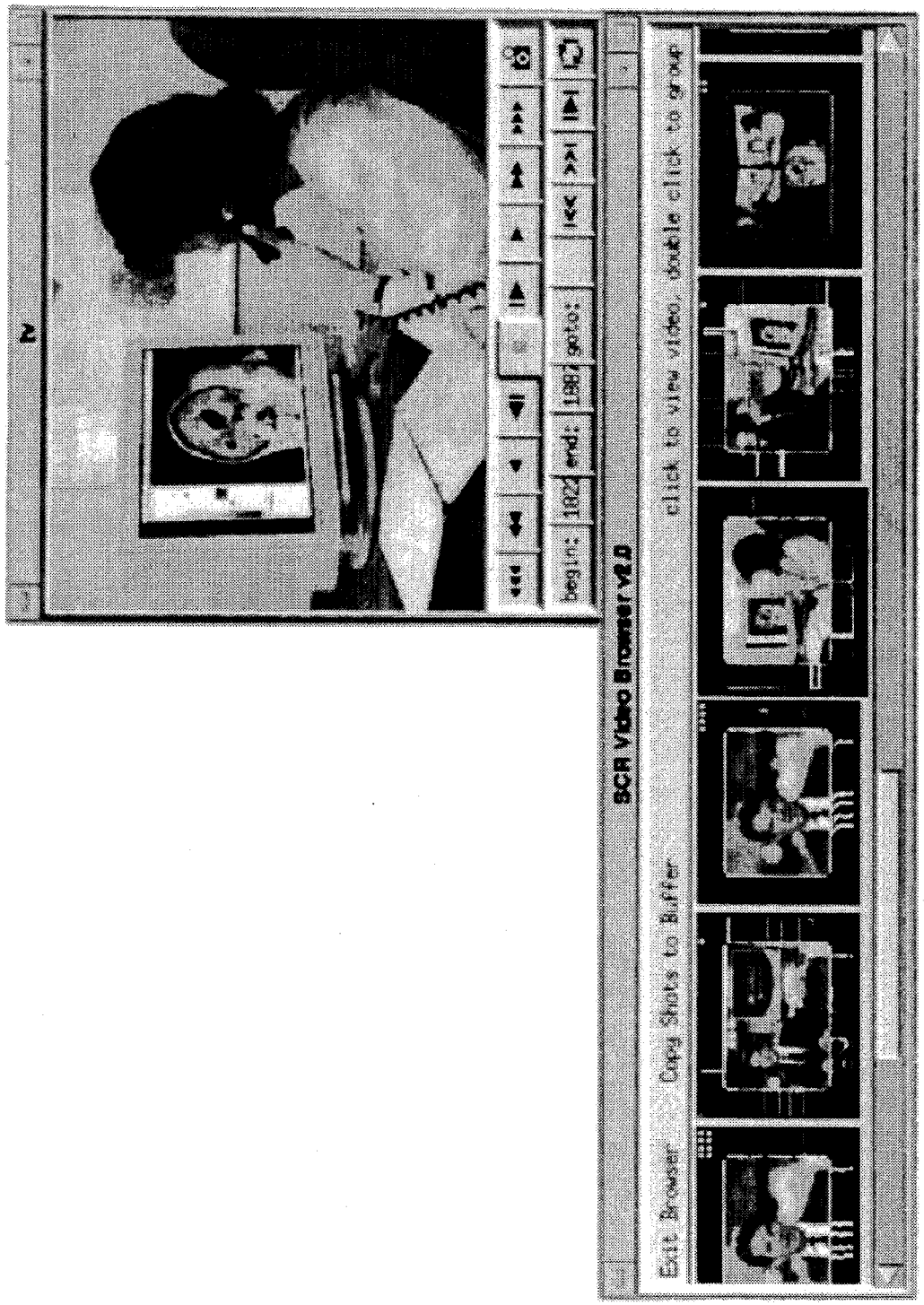
FIG. 2 shows the browser in the basic mode of operation.
Figure 3:
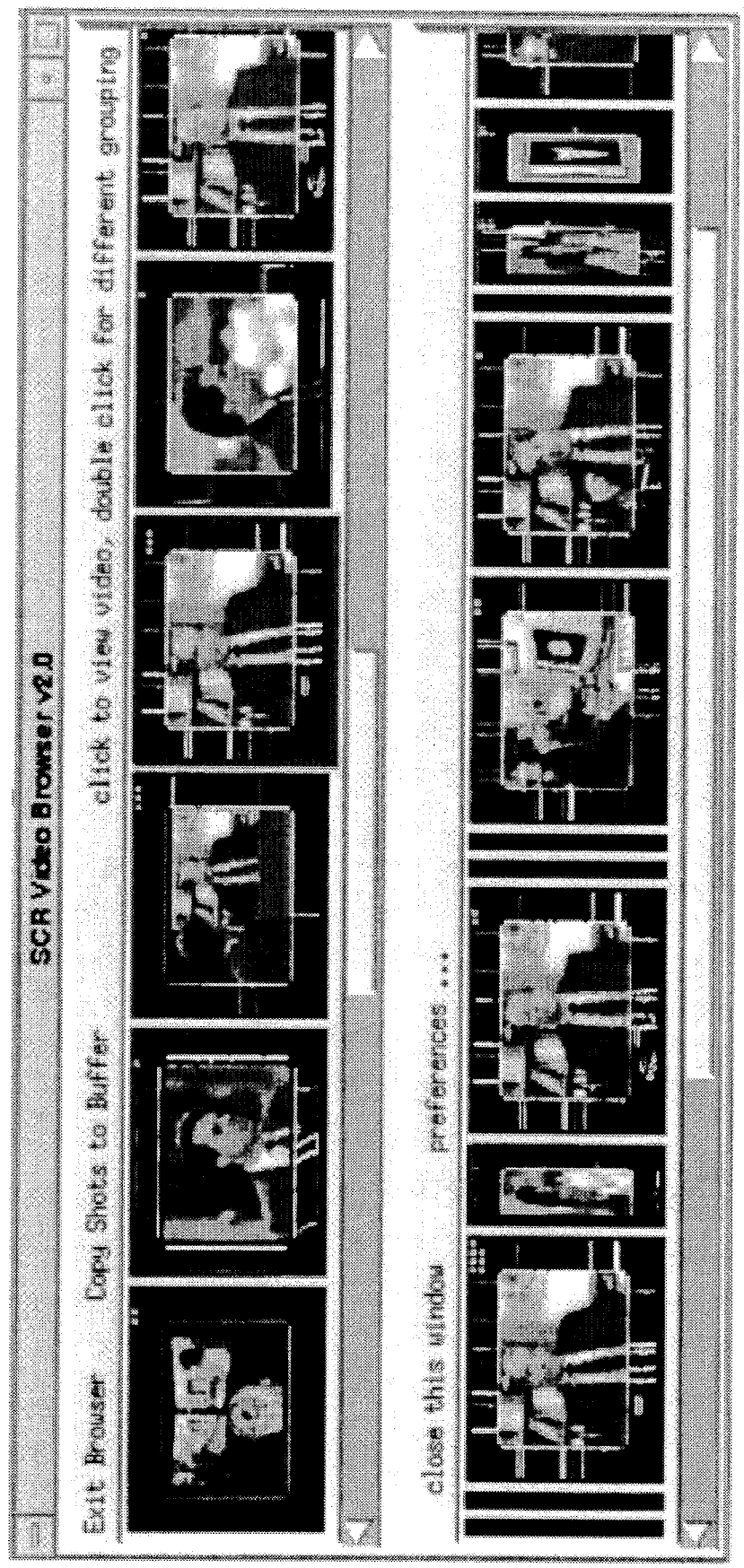
FIG. 3 shows the browser in the advanced mode of operation.
Figure 4:
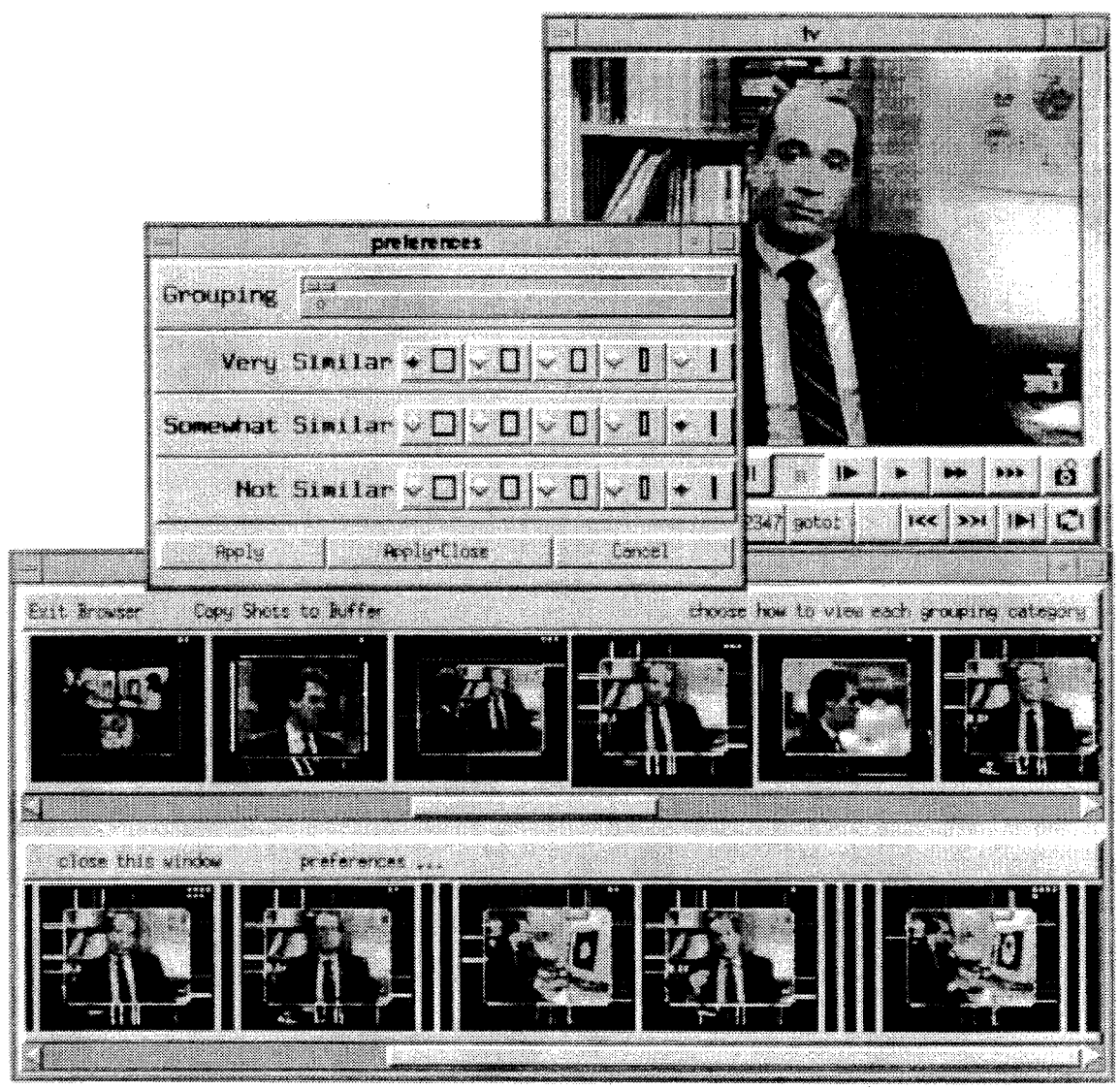
FIG. 4 shows the browser in the advanced mode of operation with prefs.

At start up, the browser displays the precomputed Rframes in chronological order, (see FIG. 2, which shows the browser in the basic mode of operation. The row of Rframes is on the bottom, and the sequence at the point chosen by the user is displayed on top. The user may play the video from that pointand automatically stop at the end of the shot, or continue past the scene change.). The user may scroll through the Rframes and once an Rframe is chosen, then the video is played from precisely that point. The user's second option is to choose one Rframe and view all other similar Rframes. The degree to which each Rframe in the sequence is similar to the chosen Rframe is conveyed to the user by varying the size of each Rframe. The most similar Rframes are displayed at their original scale, somewhat similar Rframes are displayed at a smaller scale, for example, at a default value of 33% scale, and the dissimilar Rframes are displayed at even a smaller scale (default 5%), see FIG. 3, which shows the browser in the advanced mode of operation. The top row is the original set of Rframes, the user has the chosen one Rframe (outlined by the red square) and the bottom row show all other similar Rframes, somewhat similar Rframes are shown at 33% of the original width, and non-similar Rframes are shown at 5% of the original width-scene as black bars. The defaults are easily adjustable by the user (see FIG. 4, which shows the browser in the advanced mode of operation with prefs.). The browser in the advanced mode of operation as the user is choosing how to view each grouping category in the preferences window. The shown setting indicates that the somewhat and not similar Rframes be shown as black bars, and only the similar Rframes are shown at full scale.).

In addition to asking similar Rframes to be displayed on the second row of the browser, the user can combine several requests: show Rframes that are "similar" to Rframe X and "not similar" to Rframe Y. After each request the results are shown on a new reel of Rframes. Therefore, the user may have several reels at any time each containing a different "view" of the same sequence. The user's requests may be performed on any one of reels and the results displayed in a new reel or by overwriting an existing one depending on user's preferences.

As mentioned earlier, the browser must be as convenient to use as the current method of FF/REW. The proposed browser satisfies this criterion; the only user required actions are scroll and single or double clicks on a control mouse.

Assuming the scene changes have been detected, several issues arise when there are numerous Rframes—for example, more than the user can easily search and navigate through. As mentioned earlier, the user may choose one Rframe and ask the system to return all similar Rframes in the same videosequence. The key to measure this similarity effectively and correctly is the means by which each Rframe is represented internally. Representations are used to describe Rframes, a key issue in the field of computer vision. The representations dictate the matching strategy, its robustness, and the system's efficiency. Also, the descriptions are used in the calculations of various properties of objects in the scene needed during the grouping stage. In almost all cases, the two-dimensional array of numbers used to display the Rframes is not very useful in its "raw" form.

The browser uses two representation schemes which complement one another: Shape properties represented using moments, and color properties represented using color histograms. Both representation schemes are insensitive to minor changes in the scene, such as object motion, viewing distance, and so forth, and both are compact representations allowing for efficient similarity measurements. The following two sections describe these representation schemes and their usage in more detail.

The shape of objects within an Rframe is the main property used in Rframe management, and it is represented using moment invariants. The moment of an image f(x,y) is defined as:

$$m_{pq} = \Sigma\Sigma x^p y^q f(x,y) \quad (2)$$

A physical interpretation of moments is possible if the grey level of each Rframe is regarded as its mass; then, in such an analogy, $m_{00}$ would be the total mass of an Rframe and $m_{20}$ and $m_{02}$ would be the moments of inertia around the x and y axes. Moments invariants exhibit characteristics which makes them an ideal representation mechanism in the video browser. Invariance with respect to any of scale change, rotation, and translation, are some of such characteristics which are used in the browser to describe Rframes. Moment invariants are derived from normalized central moments defined as:

$$\eta pq = \frac{1}{m_{00}^\gamma} \Sigma\Sigma(x-\bar{x})^p (y-\bar{y})^q f(x,y) \quad (3)$$

Then, the first few moment invariants are defined as (M.-K. Hu, Pattern Recognition by moment invariants, in Proc. IRE, Vol. 49, 1961, p. 1428. M.-K. Hu, Visual pattern recognition by moment invariants, in IRE Trans. Inform. Theory, Vol. 8, February 1962, pp. 179–187. R. Gonzalez and P. Witz, Digital Image Processing, Addison-Wesley, Readings, Mass., 1977.):

$$\phi_1 = \eta_{20} + \eta_{02}$$

$$\phi_2 = (\eta_{20} - \eta_{02})^2 + 4\eta_{11}^2 \quad (4)$$

$$\phi_3 = (\eta_{30} - 3\eta_{12})^2 + (3\eta_{21} - \eta_{03})^2$$

The shape of each Rframe is then represented using the vector defined as:

$$\vec{\sigma} = \{\phi_1, \phi_2, \phi_3, \ldots, \phi_7\} \quad (5)$$

Finally, the Euclidean distance (this distance may be the dot product of the two vectors, so that in general, a "metric" distance can be measuring similarity) is used to measure the similarity of two Rframes:

$$\psi(\alpha, \beta) = |\vec{\sigma_\alpha} - \vec{\sigma_\beta}|^2 \quad (6)$$

Color is the second feature used extensively in Rframe management in accordance with the present invention. Color has many of the characteristics of moments, such as the ability to simply represent, or describe each Rframe. Contrary to the case of moments, however, it is less sensitive to differences, such as due to motion within a frame. Color cannot be the sole representation of Rframe contents because most means of representing color rely on color histograms which by definition are plurality-to-one mapping functions. Hence, many completely different Rframes, or video frames, may have very similar color representations. Color histograms alone are not sufficient to detect any differences in a red and white checkered board versus a white board with red parallel lines, for example, since the color contents of the two can be identical.

The browser represents the color contents of each Rframe using the color histogram, which is essentially the frequency distribution function of the color of each pixel. Given a color model (RGB, HSI, etc.), the histogram is obtained by counting how many times each color appears in each Rframe (see C. L. Novak and S. A. Shafer, Anatomy of a Color Histogram, in Proceeding of Computer Vision and Pattern Recognition, Champaign, Ill., June, 1992, pp. 599–605 for more details). It is herein recognized to use the hue and saturation components of the HSI color space, in accordance with the inventors' previous work: F. Arman, A. Hsu and M-Y. Chiu, Image Processing on Encoded Video Sequences, in ACM Multimedia Systems Journal, to appear 1994 to calculate the color histogram for each Rframe. In order to measure the similarity of two given Rframes, the technique of histogram intersection known from Swain and Ballard (Swain, M. J. and Ballard, D. H., Color Indexing, in Int. J. of Computer Vision, Vol. 7, No. 1, 1991, pp. 11–32) is herein applied. The intersection of two histograms is defined as:

$$\sum_{j=1}^{n} \min(\alpha(j), \beta(j)) \qquad (7)$$

where $\alpha$ and $\beta$ are the two histograms. The result of this intersection indicates how many pixels in one image have corresponding pixels of the same color in the other image, and the measure is normalized using:

$$\epsilon(\alpha, \beta_i) = \left( \sum_{j=1}^{n} \min(\alpha(j), \beta_i(j)) \right) / \left( \sum_{j=1}^{n} \beta_i(j) \right) \qquad (8)$$

where $\beta_i$ is the ith histogram.

Once the user has chosen an Rframe, the moments and the color histogram of that Rframe are compared to the remaining Rframes. The output of the moment-based and color histogram-based analyses are two floating point numbers describing the similarity in shape and in color of the Rframes' body. In order to combine and compare these two different entities a mapping function is used which maps both entities onto a common space. This is performed using:

$$\Omega(\zeta) = \begin{cases} 3 \text{ if} & \zeta < \tau_1 \\ 2 \text{ if } \tau_1 \leq & \zeta \leq \tau_2 \\ 1 \text{ if} & \zeta > \tau_2 \end{cases} \qquad (9)$$

where $\zeta = \epsilon(\alpha, \beta_i)$ for mapping of color histogram intersection output of Equation (7):

$$\Omega_{histogram}[\epsilon(\alpha, \beta_i)] \in \{1, 2, 3\} \qquad (10)$$

and $\zeta = (\alpha, \beta_i)$ for mapping moment distance measure of Equation (5):

$$\Omega_{moment}[(\alpha, \beta_i)] \in \{1, 2, 3\} \qquad (11)$$

$\Omega=3$ signifies very similar, $\Omega=2$ somewhat similar, and $\Omega=1$ not similar.

The rules of Table 1 are then used to combine the mapped properties. Generally, the output of

TABLE 1

| moment | color | final |
|---|---|---|
| 3 | 3 | 3 |
| 3 | 2 | 3 |
| 3 | 1 | 2 |
| 2 | 3 | 3 |
| 2 | 2 | 2 |
| 2 | 1 | 1 |
| 1 | 3 | 1 |
| 1 | 2 | 1 |
| 1 | 1 | 1 |

The rules for combining the results of the moment-based and histogram-based matching: 3 = very similar, 2 = somewhat similar, and 1 = not similar.

moments carries a bigger weight (see Table 1). If Wmoment=1 then the output of the color-histogram-based analysis is ignored; i.e., the final output will always be that the two Rframes under examination are not similar. If Wmoment=3 then the final output is also very similar, the only exception being when color-based output Whistogram=1 in which case the final output will also be 2, or somewhat similar. The mapping from color histogram is used when Wmoment is not conclusive; i.e., Wmoment=2; in this case the final output is set to the value of the color histogram mapping.

The processing time for the grouping takes advantage of two points. First, the moments and the histograms are calculated a priori and the only step needed at run time is measuring similarity; i.e., applying Equation (2) and Equation (8). Second, using the rules specified in Table 1, the histogram intersection operation, the more expensive of the two operations, has to be performed on a subset of the Rframes providing additional time saving steps. It is also contemplated within the context of the present invention to utilize an indexing scheme to store the histogram and the moment calculations; this greatly speeds up the grouping time.

Reference is also made to Tonomura, Y. and Abe, S., Content Oriented Visual Interface Using Video Icons for Visual Database Systems, in Journal of Visual Languages and Computing, Vol. 1, 1990, pp. 183–198.

It should be clearly understood that the foregoing embodiments are practiced by the use of a programmed digital computer. The invention has been explained by way of exemplary embodiments. However, it will be understood that various changes and modifications will be apparent to one of skill in the art to which the present invention pertains, but such changes and modifications are understood to be within the spirit of the invention whose scope is defined by the claims following.

We claim:

1. A computer-implemented method for representing contents of a video sequence for allowing a user to rapidly view a video sequence in order to find a particular desired point within said sequence and/or to decide whether said contents of a video sequence are relevant to a user, said video sequence having been pre-processed to detect scene changes and to build Rframes, an Rframe being a representation of a sequence of images, and for allowing a user to scroll through said Rframes in a given manner and to stop at a selected Rframe for processing, said method comprising:

(a) playing said video sequence from the beginning of a shot represented by said selected Rframe to the end of said shot;

(b) detecting all Rframes having respective degrees of similarity to said Rframe selected by said user; and (c) presenting said similar Rframes to said user in a size or scale representative of said degrees of similarity.

2. A method for representing contents of a video sequence in accordance with claim 1, wherein step (b) is performed by evaluating Rframe shape properties represented by using a respective moment for each Rframe image.

3. A method for representing contents of a video sequence in accordance with claim 2, wherein said moment of said R frame image is defined as:

$$m_{pq} = \Sigma \Sigma x^p y^q f(x, y) \qquad (2)$$

where, in reference to an image $f(x, y)$, $m_{00}$ corresponds to a total mass of a frame and $m_{20}$ correspond to moments of inertia about the x and y axes, and a moment invariant derived therefrom is defined as $$\eta_{pq} = \frac{1}{m_{00}^\gamma} \Sigma\Sigma (x - \bar{x})^p (y - \bar{y})^q f(x, y) \qquad (3)$$

where $$\gamma = \left( \frac{p+q}{2} + 1 \right), \bar{x} = m_{10}/m_{00} \text{ and } \bar{y} = m_{01}/m_{00}$$

and the first few moment invariants are defined as $$\phi_1 = \eta_{20} + \eta_{02}$$

$$\phi_2 = (\eta_{20} - \eta_{02})^2 + 4\eta_{11}^2 \qquad (4)$$

$$\phi_3 = (\eta_{30} - 3\eta_{12})^2 + (3\eta_{21} - \eta_{03})^2$$

The shape of each Rframe is then represented using the vector $\vec{\sigma}$ defined as:

$$\vec{\sigma} = \{\phi_1, \phi_2, \phi_3, \ldots, \phi_7\} \quad (5)$$

and a "metric distance" $\psi(\alpha,\beta)$ is used to measure the similarity of two Rframes:

$$\psi(\alpha,\beta) = |\vec{\sigma_\alpha} - \vec{\sigma_\beta}|^2$$

4. A method for representing contents of a video sequence in accordance with claim 1, wherein step (b) is performed by evaluating Rframe color properties represented by using color histograms.

5. A method for representing contents of a video sequence in accordance with claim 1, wherein step (b) is performed by evaluating shape properties represented by using moments and Rframe color properties represented using color histograms.

6. A method for representing contents of a video sequence in accordance with claim 5, wherein said moment of said R frame is defined as:

$$m_{pq} = \Sigma\Sigma x^p y^q f(x,y) \quad (2)$$

and a moment invariant derived therefrom is defined as $$\eta_{pq} = \frac{1}{m_{00}^\gamma} \Sigma\Sigma(x-\bar{x})^p (y-\bar{y})^q f(x,y)$$

where $$\gamma = \left(\frac{p+q}{2} + 1\right), \bar{x} = m_{10}/m_{00} \text{ and } \bar{y} = m_{01}/m_{00}.$$

the first few moment invariants are defined as $$\phi_1 = \eta_{20} + \eta_{02}$$

$$\phi_2 = (\eta_{20} - \eta_{02})^2 + 4\eta_{11}^2 \quad (4)$$

$$\phi_3 = (\eta_{30} - 3\eta_{12})^2 + (3\eta_{21} - \eta_{03})^2$$

The shape of each Rframe is then represented using the vector $\vec{\sigma}$ defined as:

$$\vec{\sigma} = \{\phi_1, \phi_2, \phi_3, \ldots, \phi_7\} \quad (5)$$

and a "metric distance" is used to measure the similarity of two Rframes:

$$\psi(\alpha,\beta) = |\vec{\sigma_\alpha} - \vec{\sigma_\beta}|^2$$

and
wherein a color histogram is obtained by counting how many times each color appears in each Rframe, using hue and saturation components of the HSI color space to calculate the color histogram for each Rframe; and
measuring similarity by the technique of histogram intersection, defined as:

$$\sum_{j=1}^{n} \min(\alpha(j),\beta(j)) \quad (7)$$

where $\alpha$ and $\beta$ are the two histograms, whereby the result of this intersection indicates how many pixels in one image have corresponding pixels of the same color in the other image, and the measure is normalized using:

$$\epsilon(\alpha,\beta_i) = \left(\sum_{j=1}^{n} \min(\alpha(j),\beta_i(j))\right) / \left(\sum_{j=1}^{n} \beta_i(j)\right) \quad (8)$$

where $\beta_i$ is the ith histogram.

7. A computer-implemented method for representing contents of a video sequence for allowing a user to rapidly view a video sequence in order to find a particular desired point within said sequence and/or to decide whether said contents of a video sequence are relevant to a user, said video sequence having been pre-processed to detect scene changes and to build Rframes, an Rframe being a representation of a sequence of images, and for allowing a user to scroll in a given order through said Rframes and to stop at a selected Rframe for processing, said method comprising:

(a) playing said video sequence from the beginning of a shot represented by said selected Rframe to the end of said shot;

(b) detecting all Rframes having respective degrees of similarity to said Rframe selected by said user; and (c) presenting Rframes having one of a predetermined degree of similarity to said Rframe selected by said user and predetermined degree of dissimilarity to said Rframe selected by said user.

8. A method for representing contents of a video sequence in accordance with claim 7, comprising the steps of:

comparing remaining, non-selected Rframes in said video sequence using moment and color histogram-based descriptions;

mapping similarity measures using:

$$\Omega(\zeta) = \begin{cases} 3 \text{ if} & \zeta < \tau_1 \\ 2 \text{ if } \tau_1 \leq & \zeta \leq \tau_2 \\ 1 \text{ if} & \zeta > \tau_2 \end{cases}$$

where $\zeta = \epsilon(\alpha,\beta_i)$ for mapping of color histogram intersection output of the equation $$\Omega_{histogram}[\epsilon(\alpha,\beta_i)] \in \{1,2,3\}$$

and $\zeta = (\alpha,\beta_i)$ for mapping moment distance measure of the equation $$\Omega_{moment}[(\alpha,\beta_i)] \in \{1,2,3\}, \text{ where}$$

$\Omega=3$ signifies very similar, $\Omega=2$ somewhat similar, and $\Omega=1$ not similar.

9. A method for representing contents of a video sequence in accordance with claim 8, wherein if $\Omega$moment=1 then the output of said comparing using said color-histogram-based description is ignored;

if $\Omega$moment=3 then a final output is very similar, an only exception being when color-based output Whistogram=1 in which case said final output will also be 2, or somewhat similar; and utilizing mapping from using said color-histogram-based description when Wmoment is not conclusive.

\* \* \* \* \*